US012510876B2

(12) United States Patent
Gandhi et al.

(10) Patent No.: US 12,510,876 B2
(45) Date of Patent: Dec. 30, 2025

(54) MACHINE STATE VISUALIZATION (71) Applicant: Baker Hughes Holdings LLC, Houston, TX (US)

(72) Inventors: Shrenik Gandhi, Mumbai (IN); Ketan Ghamande, Mumbai (IN); Pabbaraju Venkata Naga Lalith Pranith, Mumbai (IN)

(73) Assignee: Baker Hughes Holdings LLC, Houston, TX (US)

( * ) Notice: Subject to any disclaimer, the term of this patent is extended or adjusted under 35 U.S.C. 154(b) by 4 days.

(21) Appl. No.: 17/658,028

(22) Filed: Apr. 5, 2022

(65) Prior Publication Data

US 2022/0342383 A1 Oct. 27, 2022

Related U.S. Application Data

(60) Provisional application No. 63/178,299, filed on Apr. 22, 2021.

(51) Int. Cl.
*G05B 19/4069* (2006.01)
*G05B 19/406* (2006.01)
(Continued)

(52) U.S. Cl.
CPC ....... *G05B 19/4069* (2013.01); *G05B 19/406* (2013.01); *G05B 19/409* (2013.01);
(Continued)

(58) Field of Classification Search
CPC . G05B 19/406; G05B 19/4069; G05B 19/409
See application file for complete search history.

(56) References Cited

U.S. PATENT DOCUMENTS

| | | | |
|---|---|---|---|
| 6,901,560 B1 * | 5/2005 | Guerlain | G05B 23/0267 |
| | | | 715/833 |
| 2009/0089709 A1 * | 4/2009 | Baier | G05B 19/409 |
| | | | 715/817 |

(Continued)

*Primary Examiner* — William L Bashore
*Assistant Examiner* — Sajeda Muhebbullah
(74) *Attorney, Agent, or Firm* — Mintz, Levin, Cohn, Ferris, Glovsky and Popeo, P.C. US (57) ABSTRACT

In some implementations, a method includes receiving data characterizing an operating parameter of a machine, a time period of detection of the operating parameter, and one or more operating states associated with the machine. The method also includes rendering, in a graphical user interface (GUI) display space, a graph including a plot of the received data characterizing the operating parameter. A first axis of the graph is indicative of the time period and a second axis of the graph is indicative of the operating parameter. The method further includes receiving data characterizing user interaction with a first interactive graphical object located in the GUI display space. The first interactive graphical object indicative of a first operating state of the machine over a first sub-period of the time period. The method further includes replacing the first interactive graphical object with a first expanded interactive graphical object. The first expanded interactive graphical object overlays a first portion of the plot of the operating parameter detected during the first sub-period.

12 Claims, 4 Drawing Sheets

(51) Int. Cl.
  *G05B 19/409* (2006.01)
  *G06F 3/048* (2013.01)
  *G06F 3/0481* (2022.01)
  *G06F 3/04817* (2022.01)
  *G06F 3/0484* (2022.01)
  *G06F 3/04842* (2022.01)
  *G06F 3/04845* (2022.01)
  *G06T 11/20* (2006.01)

(52) U.S. Cl.
  CPC ............ *G06F 3/048* (2013.01); *G06F 3/0481* (2013.01); *G06F 3/04817* (2013.01); *G06F 3/0484* (2013.01); *G06F 3/04842* (2013.01); *G06F 3/04845* (2013.01); *G06T 11/206* (2013.01); *G05B 2219/31472* (2013.01); *G05B 2219/32128* (2013.01)

(56) References Cited

U.S. PATENT DOCUMENTS

| | | | |
|---|---|---|---|
| 2011/0138303 A1* | 6/2011 | Ark | H04L 12/1831 715/753 |
| 2012/0120078 A1* | 5/2012 | Hubbard | G06F 11/3055 345/440.2 |
| 2012/0262472 A1* | 10/2012 | Garr | G06T 11/206 345/589 |
| 2014/0078151 A1* | 3/2014 | Garr | G05D 23/1917 345/440.2 |
| 2019/0050117 A1* | 2/2019 | Coulthard | G06F 16/235 |
| 2020/0116766 A1* | 4/2020 | Teachman | G01R 31/40 |
| 2021/0255748 A1* | 8/2021 | Rickard | G06F 3/0484 |

\* cited by examiner

MACHINE STATE VISUALIZATION

RELATED APPLICATION

This application claims priority under 35 U.S.C. § 119(e) to U.S. Provisional Patent Application No. 63/178,299 filed on Apr. 22, 2021, the entire content of which is hereby expressly incorporated by reference herein.

BACKGROUND

It can be difficult to manually monitor complex machines that have several moving and/or vibrating parts (e.g., turbines, compressors, etc.). Monitoring systems are commonly used to monitor the operation of complex machines, and generate alarms when the machine is not operating as desired. Monitoring systems can include sensors to detect operational information (e.g., temperature, pressure, vibration, etc.) associated with the machines, and relay a signal to a computing device which can visually present the operational information for a designated personnel. Operational information of a complex machine can include information related to multiple operational parameters and multiple operational states of the machine. When reviewing the operating behavior of a machine and investigating alarms that have been triggered, it is valuable to view trend data over time.

SUMMARY

Various aspects of the disclosed subject matter may provide one or more of the following capabilities.

In some implementations, a method includes receiving data characterizing an operating parameter of a machine, a time period of detection of the operating parameter, and one or more operating states associated with the machine. The method also includes rendering, in a graphical user interface (GUI) display space, a graph including a plot of the received data characterizing the operating parameter. A first axis of the graph is indicative of the time period and a second axis of the graph is indicative of the operating parameter. The method further includes receiving data characterizing user interaction with a first interactive graphical object located in the GUI display space. The first interactive graphical object indicative of a first operating state of the machine over a first sub-period of the time period. The method further includes replacing the first interactive graphical object with a first expanded interactive graphical object. The first expanded interactive graphical object overlays a first portion of the plot of the operating parameter detected during the first sub-period.

One or more of the following features can be included in any feasible combination.

In some implementations, the first sub-period temporally extends from a first time value to a second time value. The first and the second time values are included in the time period associated with detection of the operating parameters. In some implementations, the first expanded interactive graphical object bounded by a first and a second edge parallel to the second axis. The first edge passes through a first point indicative of the first time value on the first axis, and the second edge passes through a second point indicative of the second time value on the first axis. In some implementations, the method further includes receiving data characterizing user interaction with the first expanded interactive graphical object; and replacing the first expanded interactive graphical object with the first interactive graphical object. In some implementations, the first expanded interactive graphical object and the first portion of the plot of the operating parameter are simultaneously displayed.

In some implementations, the method further includes receiving data characterizing user interaction with a second interactive graphical object located in the GUI display space. The second interactive graphical object is indicative of a second operating state of the machine over a second sub-period of the time period. The method further includes replacing the second interactive graphical object with a second expanded interactive graphical object. The second expanded interactive graphical object overlays a second portion of the plot of the operating parameter detected during the second sub-period. In some implementations, the GUI display space includes a plurality of interactive graphical objects indicative of a plurality of operating states of the machine and arranged parallel to the first axis. The plurality of interactive graphical objects include the first interactive graphical object and the second interactive graphical object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

A complex machine can operate in multiple operational states and have multiple operating parameters. Monitoring complex machines can be a challenging task. Monitoring the operation of a machine can improve machine longevity and the safety of the facility housing the machine. Machine operation can be detected (for example, by a network of sensors), and respond appropriately to the detected undesired behavior. Monitoring can be performed by detecting (e.g., by a network of sensors) the operating parameters of the machine. The detected operating parameters can be presented to a user of the machinery (e.g., a plot of an operating parameter as a function of time can be displayed on a GUI display space). However, simply displaying the operating parameters may fail to provide the user with information related to a possible undesired behavior of the machine.

As an example, by simply looking at the plot of the operating parameter, the user may not know that the value of the operational parameter has an undesired value. For example, the value of an operating parameters that may be considered normal when the machine is in the start-up state may be considered abnormal when the machine is in steady state operation state. Embodiments of the current disclosure provide an improved graphical user interface (GUI) that can simultaneously present both the operating parameter information and the operating state information. This can provide the user with the desirable context of machine operation. Additionally, the GUI can be interactive and can allow the user to determine the manner in which the operating parameter information and the operating state information are displayed.

In some implementations, the operating state information can be represented as an interactive object placed on or adjacent to the graph with the plot of the operating parameter as a function of time. A user can interact with the interactive graphical object (e.g., by clicking on it). Based on this interaction, the interactive graphical object can be replaced (or expanded) with an expanded interactive graphical object that can overlay on the plot of the operating parameter. The expanded interactive object can be transparent/translucent that can allow for simultaneous viewing of the portion of the plot overlapping with the expanded interactive object. The user can interact with the expanded interactive graphical object (e.g., by clicking on it). Based on this interaction the expanded interactive graphical object can be replaced by the original interactive graphical object.

Figure 1:
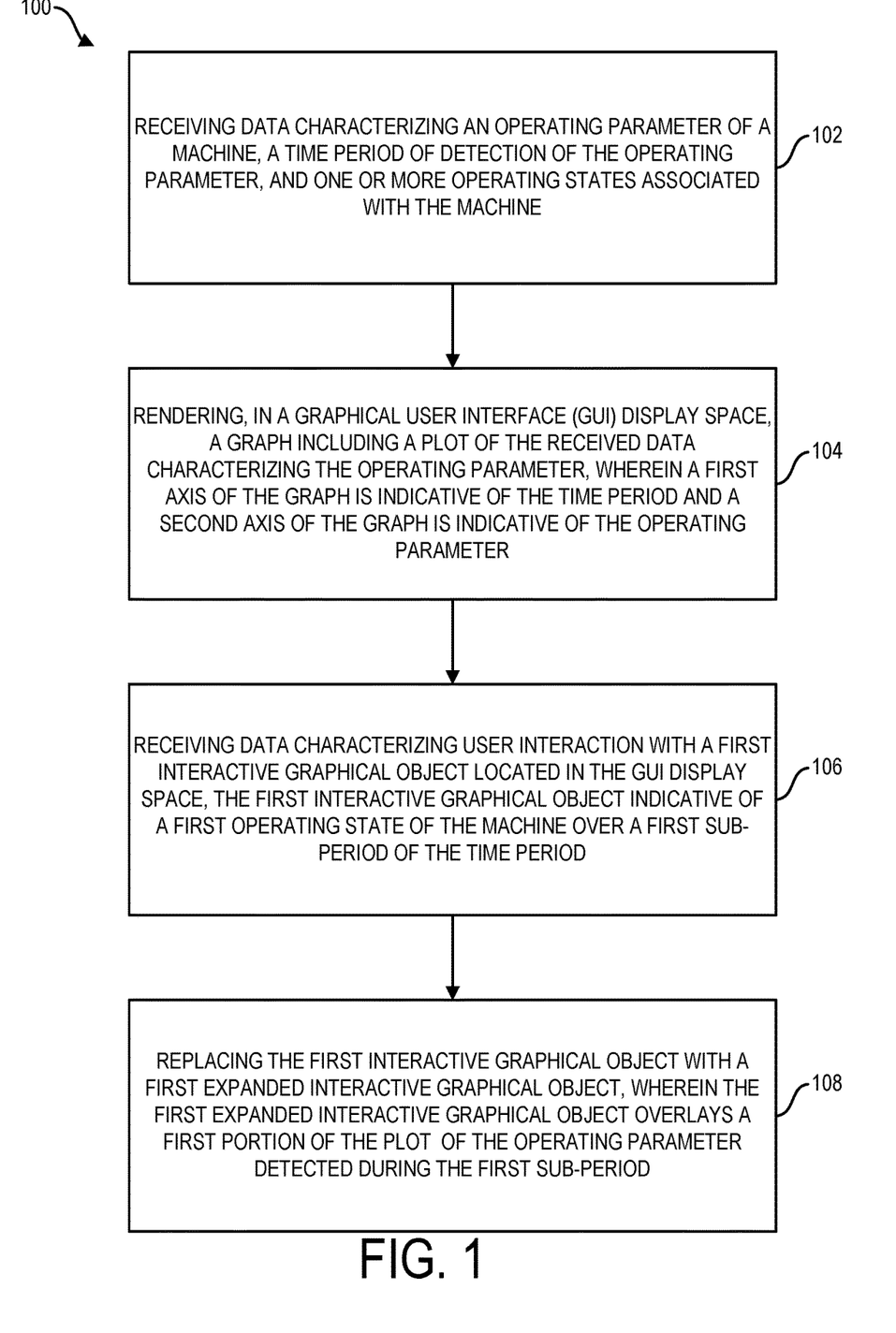
FIG. 1 is a flow chart of an exemplary method for presenting operating parameters and operating states in a graphical user interface display space.

FIG. 1 is a flow chart of an exemplary method for presenting operating parameters and operating states in a GUI display space. At step 102, data characterizing an operating parameter of a machine, a time period of detection of the operating parameter, and one or more operating states associated with the machine can be received. For example, the data can be received from the sensor operatively coupled to the machine and configured to detect the operating parameters. In some implementations, the operating parameters can be determined from one or more operating parameters of the machine. In some implementations, the data characterizing the operating parameter and/or operating states can be received from a database configured to store the operating parameter and/or operating states (e.g., as a function of detection time).

Figure 2:
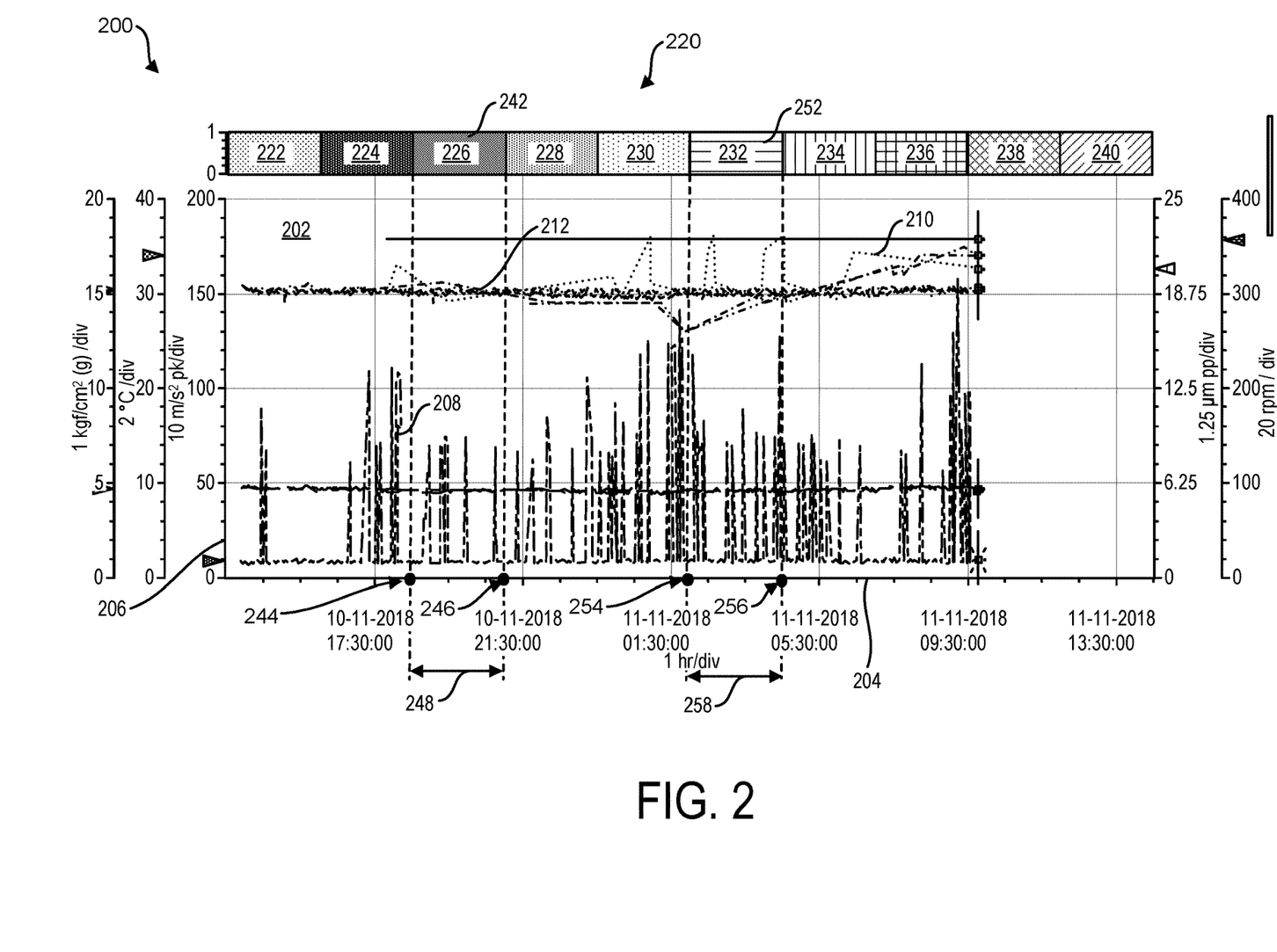
FIG. 2 illustrates an exemplary embodiment of a graphical user interface display space that includes operating parameters and operating states.

At step 104, a graph including a plot of the received data characterizing the operating parameter can be rendered in a GUI display space. The graph can include a first axis indicative of the time period and a second axis of indicative of the operating parameter. FIG. 2 illustrates an exemplary embodiment of a GUI display space 200 that includes a graph 202. The graph 202 includes a first axis 204 indicative of the time period of detection of the operating parameter and/or the operating states, and a second axis 206 indicative of the detected operating parameter (or multiple detected operating parameters). The graph 202 can include a plot 208 of the operating parameter as a function of time. The graph 202 can further include plot 210 of a second operating parameter and a plot 212 of a third operating parameter. Additionally, the GUI display space 200 can include a band 220 of interactive graphical objects 222-240. The various interactive graphical objects can be representative of operational states of the machine (e.g., start-up state, steady state, shut-down state, etc.) at various sub-periods of the time period represented by the first axis 204. In some implementations, a color of an interactive graphical object in the band 220 can be indicative of the operational state represented by the interactive graphical object.

In some implementations, the band 220 of interactive graphical objects 222-240 can be oriented parallel to the first axis 204 (e.g., each interactive graphical object in the band 220 can be oriented parallel [e.g., include an edge that is parallel] to the first axis 204), and can be displaced from the first axis 204 (e.g., along the second axis 206). The location and length of an edge of the interactive graphical object (e.g., parallel to the first axis) relative to the first axis 204 can be indicative of the start-time, end-time and time duration of the corresponding operating state of the machine. For example, an edge 242 of the interactive graphical object 226 extends from a start-time to an end-time. In other words, the operating state corresponding to the interactive graphical object 226 occurs during a sub-period that has a start-time (corresponding to the location 244 on the first axis 204), an end-time 246 (corresponding to location 246 on the first axis 204) and a time period (or first sub-period) 248. Edge 252 of another interactive graphical object 232 extends from a second start-time to a second end-time. In other words, the operating state corresponding to the interactive graphical object 232 occurs during a second sub-period that has a second start-time (corresponding to the location 254 on the first axis 204), a second end-time (corresponding to the location 256 on the first axis 204) and a second time duration 258.

At step 106, data characterizing user interaction with a first interactive graphical object (e.g., interactive graphical object 226) located in the GUI display space can be received. The user interaction can include, for example, clicking on the interactive graphical object by a user. The first interactive graphical object can be indicative of a first operating state of the machine over a first sub-period of the time period. For example, the interactive graphical object 226 can be indicative of an operating state (e.g., start-up state, shut-down state, steady state, etc.) occurs during the sub-period that has a first start-time (corresponding to the location 244 on the first axis 204), a first end-time (corresponding to the location 246 on the first axis 204) and a first sub-period 248. The first start-time and first end-time are included in the time period associated with the operating parameter received at step 102.

Figure 3:
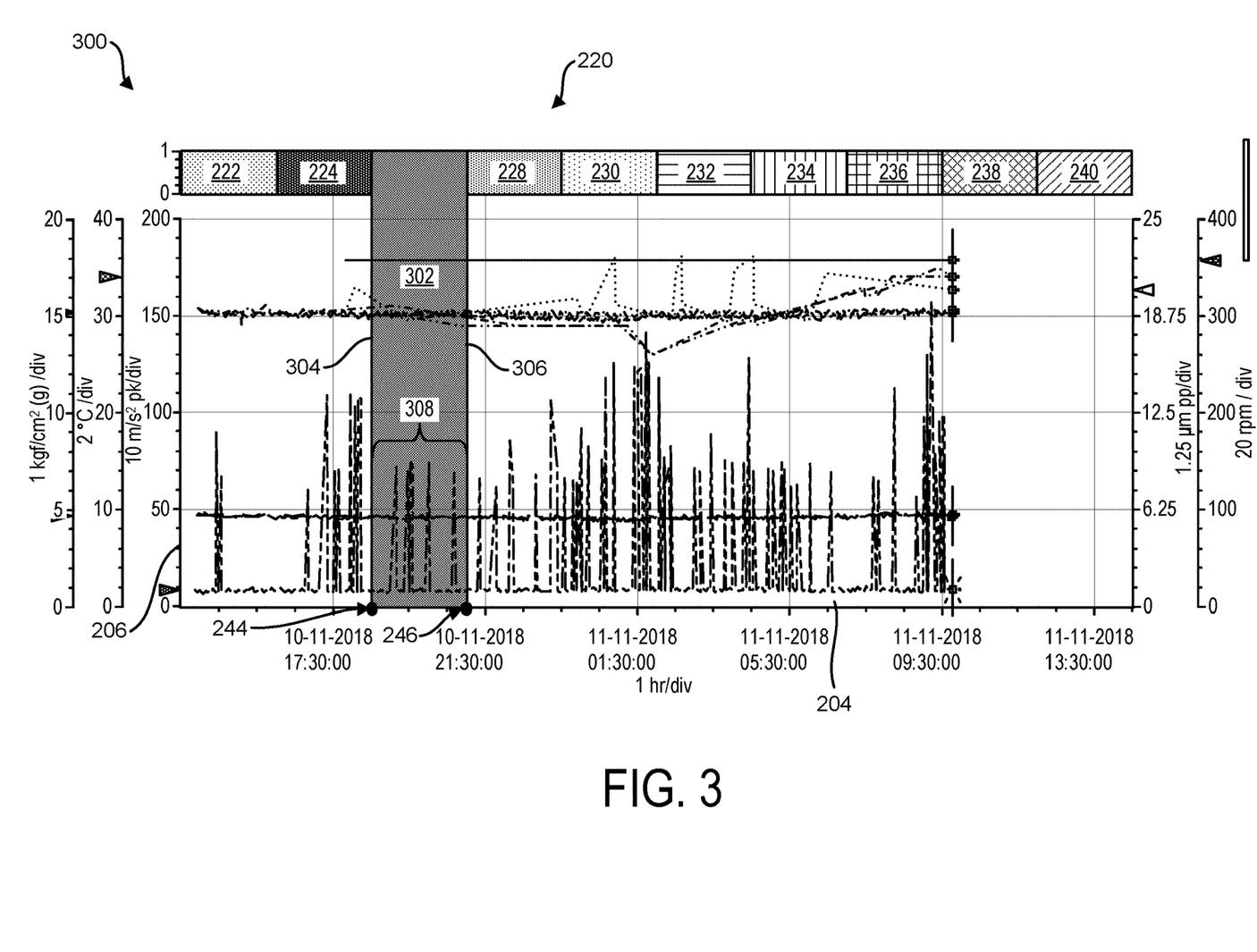
FIG. 3 illustrates the exemplary embodiment of the graphical user interface display space of FIG. 2 that includes a first expanded interactive graphical object.

At step 108, the first interactive graphical object can be replaced with a first expanded interactive graphical object. FIG. 3 illustrates the exemplary embodiment of a graphical user interface display space 200 that includes the first expanded interactive graphical object 302 (which has replaced the first interactive graphical object 226). The first expanded interactive graphical object 302 is bounded by a first edge 304 and a second edge 306. The first and the second edges can be parallel to the second axis 206. The first edge 304 passes through the location 244 on the first axis 204 (indicative of the first start-time), and the second edge 306 passes through a location 246 on the first axis 204

(indicative of the first end-time). The first expanded interactive graphical object 302 overlays a first portion 308 of the plot 208 of the operating parameter detected during the first sub-period.

In some implementations, data characterizing user interaction with a second interactive graphical object (e.g., interactive graphical object 232) located in the GUI display space can be received. The user interaction can include, for example, clicking on the second interactive graphical object by a user. The second interactive graphical object can be indicative of a second operating state of the machine over a second sub-period of the time period. For example, the interactive graphical object 232 can be indicative of an operating state (e.g., start-up state, shut-down state, steady state, etc.) occurs during the sub-period that has a second start-time (corresponding to the location 254 on the first axis 204), a second end-time (corresponding to the location 256 on the first axis 204) and a second sub-period 258. The second start-time and second end-time can be included in the time period associated with the operating parameter received at step 102. Alternately, the second interactive graphical object can be indicative of the first operating state associated with the first interactive graphical object. In other words, the machine can return to the first operating state during the time period defined by the second start-time and the second end-time after the first sub-period 248.

Figure 4:
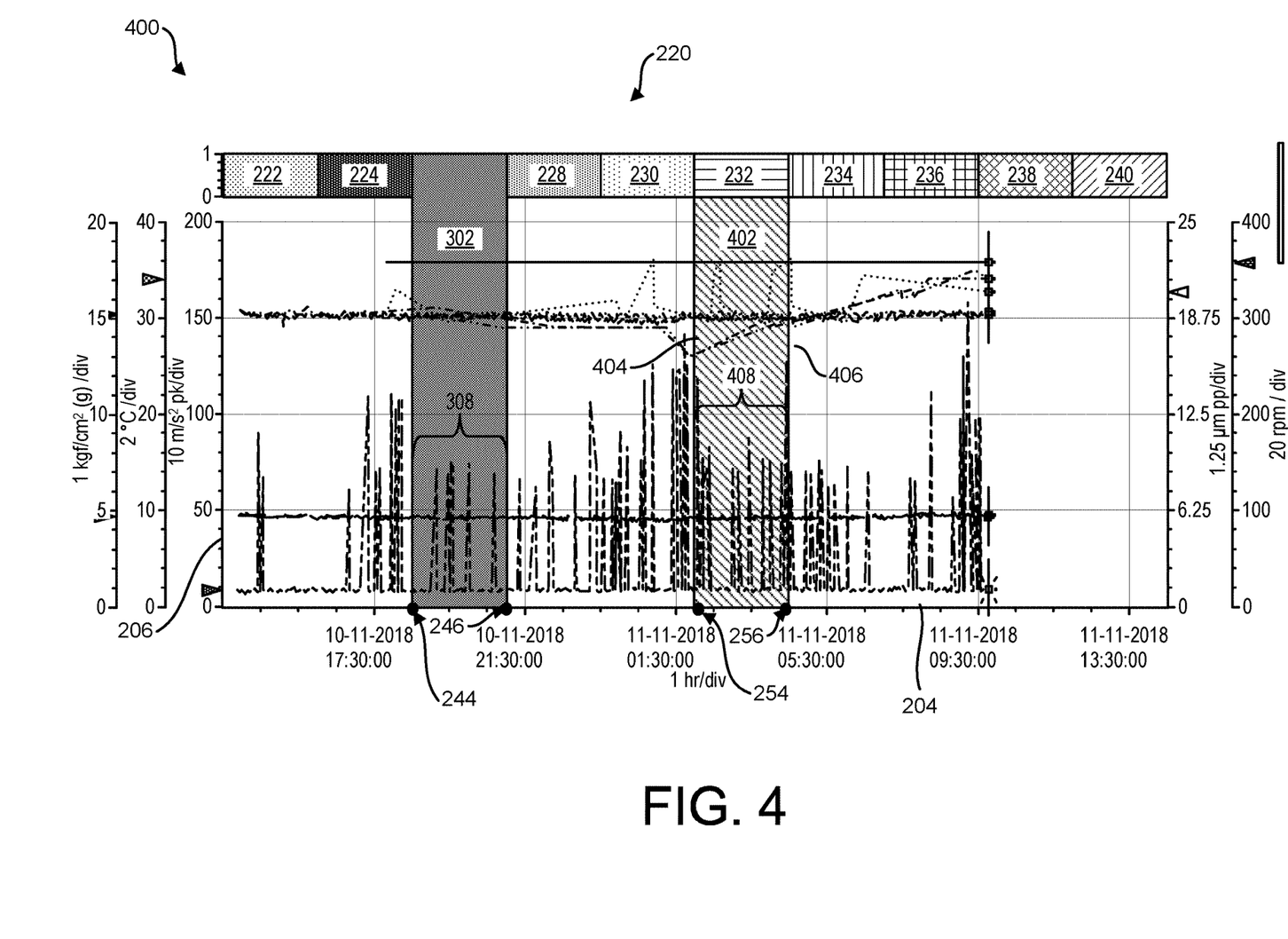
FIG. 4 illustrates the exemplary embodiment of the graphical user interface display space of FIG. 3 that includes a second expanded interactive graphical object.

Based on the user interaction with the second interactive graphical object, the second interactive graphical object can be replaced with a second expanded interactive graphical object. FIG. 4 illustrates the exemplary embodiment of the graphical user interface display space 200 that includes both the first expanded interactive graphical object 302 (which has replaced the first interactive graphical object 226) and the second interactive graphical object 402 (which has replaced the second interactive graphical object 232). The second expanded interactive graphical object 402 is bounded by a third edge 404 and a fourth edge 406. The third and the fourth edges can be parallel to the second axis 206. The third edge 404 passes through the location 254 on the first axis 204 (indicative of the second start-time), and the second edge 406 passes through a location 256 on the first axis 204 (indicative of the second end-time). The second expanded interactive graphical object 402 overlays a second portion 408 of the plot 208 of the operating parameter detected during the second sub-period.

The first and the second expanded interactive graphical objects can be translucent. In other words, the portions of the plot 208 that overlap with the first and the second expanded graphical objects (e.g., first portion 308, second portion 408) can be visible to the viewer. This can allow the user simultaneously determine the operating state of the machine for values of an operating parameter in a given sub-period of time (e.g., first sub-period 248, second sub-period 258, etc.). Knowing the operating state for operating parameter values can allow the user to determine if the machine is operating as desired. In some implementations, the color of the expanded interactive graphical object can be indicative of the operational state represented by the interactive graphical object.

The user can interact with the expanded interactive graphical object (e.g., first interactive graphical object 302, second interactive graphical object 402, etc.). For example, the user can click on the expanded interactive graphical object. Data characterizing the user interaction with the first and/or second expanded interactive graphical object can be received (e.g., by a computing device). Based on the reception of this data, the first and/or second expanded interactive graphical object can be replaced with the first and/or second interactive graphical object. For example, if the user interacts with the first expanded interactive graphical object 302 in FIG. 3, the GUI display 200 can return to the embodiment in FIG. 2 where the first expanded interactive graphical object 302 is replaced by the first graphical object 226.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving, from sensors coupled to a machine, state data characterizing a plurality of operating states of the machine during operation and monitoring data characterizing one or more operating parameters of the machine during a time period of operation;
   rendering, in a graphical user interface (GUI) display space, a graph comprising a plot of the state data and the monitoring data over time, wherein a first axis of the graph is indicative of the time period of operation and the plurality of operating states over the time period of operation and a second axis of the graph is indicative of the one or more operating parameters, wherein the GUI further comprises an interactive graphical object band spanning along an upper edge of the graph and comprising a plurality of interactive graphical objects arranged parallel to the first axis, along the second axis, wherein the plurality of interactive graphical objects correspond the plurality of operating states over the time period of operation;
   receiving data characterizing a user interaction with a first interactive graphical object of the plurality of interactive graphical objects within the interactive graphical object band, the first interactive graphical object being indicative of a first operating state of the machine over a first sub-period of the time period of operation, wherein the first interactive graphical object is bounded by a first edge indicative of a first time value of the first sub-period and a second edge indicative of a second time value of the first sub-period; and
   expanding the first interactive graphical object downward from the upper edge of the graph down to the first axis, responsive to the user interaction, thereby forming an expanded view of the first interactive graphical object, wherein the expanded view of the first interactive graphical object overlays a first portion of the plot extending from the first time value to the second time value, such that the monitoring data detected during the first sub-period between the first time value and the second time value is visible to the user through the expanded view of the first interactive graphical object.

2. The method of claim 1, wherein the first and the second time values are included in the time period of operation.

3. The method of claim 2, wherein the expanded view of the first interactive graphical object is bounded by a first and a second edge parallel to the second axis, wherein the first edge passes through a first point indicative of the first time value on the first axis, and wherein the second edge passes through a second point indicative of the second time value on the first axis.

4. The method of claim 3, further comprising:
receiving data characterizing user interaction with the expanded view of the first interactive graphical object; and
retracting the expanded view of the first interactive graphical object upward to the upper edge of the graph, thereby forming the first interactive graphical object.

5. The method of claim 1, wherein the plurality of operating states of the machine during the time period of operation comprise at least a start-up state and a shut-down state or a steady state of the machine.

6. The method of claim 1, further comprising:
receiving data characterizing a user interaction with a second interactive graphical object of the plurality of interactive graphical objects within the interactive graphical object band, the second interactive graphical object being indicative of a second operating state of the machine over a second sub-period of the time period of operation, wherein the second interactive graphical object is bounded by a third edge indicative of a third time value of the second sub-period and a fourth edge indicative of a fourth time value of the second sub-period; and
expanding the second interactive graphical object downward from the upper edge of the graph down to the first axis, responsive to the user interaction, thereby forming an expanded view of the second interactive graphical object, wherein the expanded view of the second interactive graphical object overlays a second portion of the plot extending from the third time value to the fourth time value, such that the monitoring data detected during the second sub-period between the third time value and the fourth time value is visible to the user through the expanded view of the second interactive graphical object such that the GUI display space includes both the expanded view of the first interactive graphical object and the expanded view of the second interactive graphical object.

7. A system comprising:
at least one data processor;
memory coupled to the at least one data processor, the memory storing instructions to cause the at least one data processor to perform operations comprising:
receiving, from sensors coupled to a machine, state data characterizing a plurality of operating states of the machine during operation and monitoring data characterizing one or more operating parameters of the machine during a time period of operation;
rendering, in a graphical user interface (GUI) display space, a graph comprising a plot of the state data and the monitoring data over time, wherein a first axis of the graph is indicative of the time period of operation and the plurality of operating states over the time period of operation and a second axis of the graph is indicative of the one or more operating parameters, wherein the GUI further comprises an interactive graphical object band spanning along an upper edge of the graph and comprising a plurality of interactive graphical objects arranged parallel to the first axis, along the second axis, wherein the plurality of interactive graphical objects correspond the plurality of operating states over the time period of operation;
receiving data characterizing a user interaction with a first interactive graphical object of the plurality of interactive graphical objects within the interactive graphical object band, the first interactive graphical object being indicative of a first operating state of the machine over a first sub-period of the time period of operation, wherein the first interactive graphical object is bounded by a first edge indicative of a first time value of the first sub-period and a second edge indicative of a second time value of the first sub-period; and
expanding the first interactive graphical object downward from the upper edge of the graph down to the first axis, responsive to the user interaction, thereby forming an expanded view of the first interactive graphical object, wherein the expanded view of the first interactive graphical object overlays a first portion of the plot extending from the first time value to the second time value, such that the monitoring data detected during the first sub-period between the first time value and the second time value is visible to the user through the expanded view of the first interactive graphical object.

8. The system of claim 7, wherein the first and the second time values are included in the time period of operation.

9. The system of claim 8, wherein the expanded view of the first interactive graphical object is bounded by a first and a second edge parallel to the second axis, wherein the first edge passes through a first point indicative of the first time value on the first axis, and wherein the second edge passes through a second point indicative of the second time value on the first axis.

10. The system of claim 9, wherein the operations further comprise:
receiving data characterizing user interaction with the expanded view of the first interactive graphical object; and
retracting the expanded view of the first interactive graphical object upward to the upper edge of the graph, thereby forming the first interactive graphical object.

11. The system of claim 7, wherein the plurality of operating states of the machine during the time period of operation comprise at least a start-up state and a shut-down state or a steady state of the machine.

12. The system of claim 7, wherein the at least one data processor is configured to perform operations further comprising:
receiving data characterizing a user interaction with a second interactive graphical object of the plurality of interactive graphical objects within the interactive graphical object band, the second interactive graphical object being indicative of a second operating state of the machine over a second sub-period of the time period of operation, wherein the second interactive graphical object is bounded by a third edge indicative of a third time value of the second sub-period and a fourth edge indicative of a fourth time value of the second sub-period; and
expanding the second interactive graphical object downward from the upper edge of the graph down to the first axis, responsive to the user interaction, thereby forming an expanded view of the second interactive graphical object, wherein the expanded view of the second interactive graphical object overlays a second portion of the plot extending from the third time value to the fourth time value, such that the monitoring data detected during the second sub-period between the third time value and the fourth time value is visible to the user through the expanded view of the second interactive graphical object such that the GUI display space includes both the expanded view of the first interactive graphical object and the expanded view of the second interactive graphical object.

\* \* \* \* \*